June 2, 1964  C. H. RICHARDSON  3,135,120
MASS BALANCE ADJUSTING DEVICE
Filed Dec. 5, 1961  2 Sheets-Sheet 1
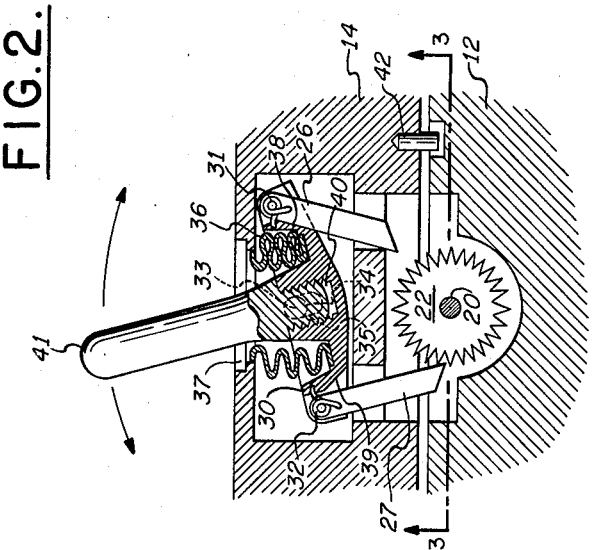
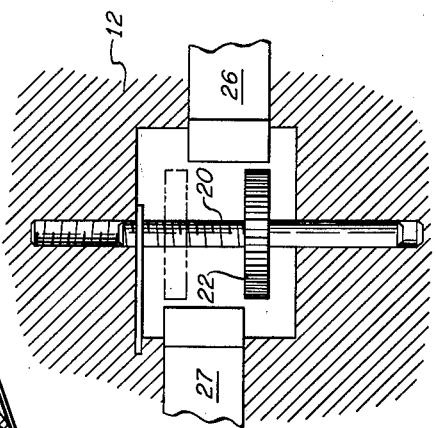
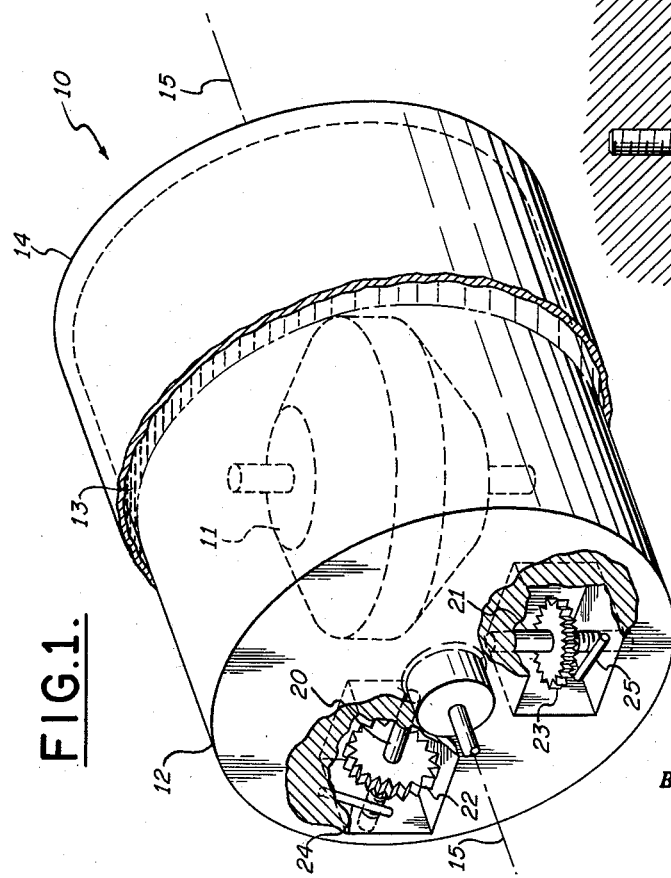
INVENTOR.
CHARLES H. RICHARDSON
BY
ATTORNEY June 2, 1964  C. H. RICHARDSON  3,135,120
MASS BALANCE ADJUSTING DEVICE Filed Dec. 5, 1961  2 Sheets-Sheet 2

INVENTOR.
CHARLES H. RICHARDSON
BY
ATTORNEY

United States Patent Office 3,135,120
Patented June 2, 1964

3,135,120
MASS BALANCE ADJUSTING DEVICE
Charles H. Richardson, Port Washington, N.Y., assignor to Sperry Rand Corporation, Great Neck, N.Y., a corporation of Delaware
Filed Dec. 5, 1961, Ser. No. 157,179
7 Claims. (Cl. 74—5.4)

The present invention relates to mass balance adjusting devices for gyroscopic instruments having a sensitive element hermetically sealed and positionably mounted within a housing.

The problem is how to make a final mass balance adjustment particularly of a floated gyroscope after the outer case of the gyroscope has been hermetically sealed and preferably on the basis of actual tests in order to minimize gyroscopic drift. In a floated gyroscope for example there is a problem of balancing the gyroscopic float about the output axis to a high degree of accuracy. The residual gyroscopic float unbalance normally cannot be corrected during the assembly of the gyroscope as the unbalance does not exist until the gyroscope is completely assembled and operating under normal conditions. This unbalance is caused by numerous minor structural distortions produced by the temperatures, pressures and vibrations associated with actual gyroscopic operation. Therefore, the final mass balance adjustment must be made after final assembly and based upon actual test data. Preferably the adjustment should be made while the gyroscope is mounted in the test fixture.

Presently, there are two prior art approaches to this problem. The first is known as the bend-balance approach in which final mass balance is achieved by bending ductile metal extensions on the float housing. This approach has the obvious disadvantages that it is a trial and error method and no adjustment is possible when the gyro outer case is sealed. Further, adjustment cannot be made during the gyro drift test and after the test the gyro outer case must be unsealed, the estimated adjustment made and then the gyro outer case resealed. In the event the initial adjustment was not correct the operation must be repeated until satisfactory results are obtained which is an expensive and time consuming procedure.

The second prior art approach is to use an O ring fork device in which the mass shifted for the final balance adjustment is a screw threaded to move radially on the gyro float. The screw has projections that are engaged loosely by the forked end of a shaft. The shaft is mounted in approximate axial alignment with the screw and extends from the float chamber through an O ring type hydraulic seal in the outer case of the gyro. The final mass balance adjustment of the gyro float is made by rotating the end of the shaft that is outside the gyro case thus rotating the balance screw.

The aforementioned arrangement has four inherent faults that make it unsuitable for use particularly on floated gyros of high accuracy and reliability. First, it is a "hit and miss" adjustment. The final adjustment of the balance screw of the typical floated gyro must be made in increments of 12 degrees or less. A total backlash of approximately 60 degrees is required between the fork and its engagement with the balance screw to permit the float freedom to rotate ± the degree or two required for normal operation. Therefore, backing the fork away from the screw about 30 degrees is necessary to prevent interference of the fork and screw projections during gyro operations. Since this is a small screwdriver adjustment it is difficult to estimate the actual balance screw rotation as it is very small compared to the backlash in the final stages of adjustment. Second, there is always a possibility that the screw adjustment may be rotated beyond its design limits thereby jamming it into the fork tight enough to damage the float suspension. Third, thermal errors may be introduced. To prevent float fluid convection torques from producing gyro errors, a highly uniform temperature must be maintained adjacent to the float. The required uniformity of temperature is disturbed by the irregularities of the gyro case required for the adjustment fork and the O ring seals. Fourth, the O ring material has been found to be gas absorbent to some extent so that gas bubbles tend to appear in the float fluid under adverse environmental conditions. Further, leaks are also caused by minor imperfections of the O ring and adjacent surfaces that result in imperfect gasketing.

It is therefore a primary object of the present invention to provide an accurate, simple mass balance adjustment device which permits final mass balance adjustment without disturbing the hermetic sealing of the gyroscopic instrument.

It is a further object of the present invention to provide a mass balance adjustment device for gyroscopic instruments which has distinct positive positions for balancing the gyroscope and eliminates any possibility of damaging the sensitive element of the gyroscope.

It is an additional object of the present invention to provide a mass balance adjustment device for hermetically sealed gyroscopic instruments in which the mass balance may be readjusted as many times as necessary without disturbing the hermetic seal of the gyroscopic instrument.

The above objects are achieved by the present invention by means of an adjustable ratchet wheel and screw mass balance assembly mounted on the sensitive element that is adjusted externally of the gyroscopic housing by means of a rocker and bellows assembly which provides a resilient hermetic seal while permitting extensions of the rocker to cooperate with the ratchet wheel for adjusting the mass balance.

Referring to the drawings,

FIG. 1 is a perspective view partly in section showing a floated single degree-of-freedom gyroscope incorporating the ratchet wheel and screw mass balance assembly of the present invention;

FIG. 2 is a sectional view showing the invention in its engaged position mounted on the single degree-of-freedom gyroscope of FIG. 1;

FIG. 3 is a view taken along lines 3—3 of FIG. 2 showing the width of the pawls;

Figure 5:
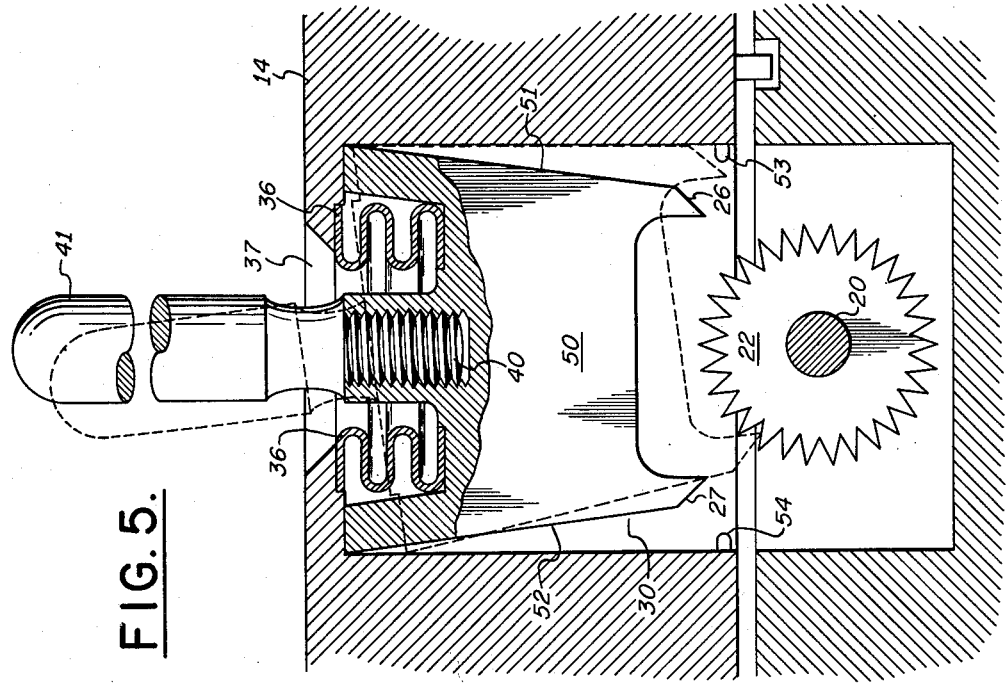
FIG. 5 is a sectional view of an alternative embodiment of the present invention.

The invention will be described with respect to a single degree-of-freedom floated gyroscope for purposes of example, it being appreciated that the invention is equally applicable to other types of sealed instruments requiring mass balance adjustments.

Referring now to FIG. 1, a single degree-of-freedom integrating gyroscope 10 consists of a gyro wheel 11, shown in dotted lines, hermetically sealed in a sensitive element having the form of a cylindrical float 12 whose overall density is the same as that of the flotation fluid 13. The flotation fluid 13 is contained by the outer housing 14 of the instrument 10 and the thin film of fluid 13 between the float 12 and the housing 14 provides the necessary integration function. The fluid 13 also provides support for the float 12 which may for example be constrained to rotate about an output axis 15 by spaced jewel bearings not shown. The gyro wheel 11 spins within the float 12 about an axis that is perpendicular with respect to the output axis 15. The sensitive element or float 12 is in turn hermetically sealed within the housing 14.

As explained to some extent above, the final mass balance adjustments of the float assembly, particularly on small floated gyros, are of the utmost importance since a torque unbalance of only 0.00005 gram-centimeters can produce a drift as great as 0.1 degree per hour. Ideally the final adjustments should be made under full operating conditions and with adequate means for drift evaluation for the reasons given above. Further, the adjustments should be made in small known increments of drift rate in order that they may be made directly in terms of test data and should not require destruction of the gyro sealing which should be hermetic to protect float-fluid integrity. Therefore, the final mass balance adjustment must be made after final assembly and based on test data.

By means of the present invention the final mass balance adjustment may be made by rotating the adjusting screws 20 and 21 that are threaded into the gyro float 12. The screws 20 and 21 have their axes mutually perpendicular to each other and to the output axis 15 of the gyro float 12. In order to rotate the screws 20 and 21, they each have a ratchet wheel 22 and 23 respectively integral therewith. The combined mass of each of the ratchet wheel and screw combinations when moved perpendicular to the output axis 15 provides the mass shift by means of which a final mass balance is obtained. The screws 20 and 21 are restrained from rotation except during adjustment by the friction of the restraining springs 24 and 25 which resiliently abut against the screws 20 and 21 respectively.

Reference is made to FIG. 2 to explain how the present invention overcomes the problem initially posed by providing adjustment of the ratchet wheel 22, for purposes of example, in a clockwise or in a counterclockwise direction while maintaining the gyroscopic instrument 10 hermetically sealed. The ratchet wheel 22 may be rotated in a clockwise direction as viewed in the drawing by means of a pawl 26 while the ratchet wheel 22 may be rotated counterclockwise by means of a pawl 27 in a manner to be described. The pawls 26 and 27 are cooperative with opposite sides of the ratchet wheel 22 and are pivotally mounted on opposite ends of a rocker plate 30. The pawls 26 and 27 are resiliently urged in a direction to engage the ratchet wheel 22 by means of springs 31 and 32 respectively. The rocker plate 30 has inclined side portions 38 and 39 that are cooperative with the pawls 26 and 27 respectively for maintaining the pawls 26 and 27 in the proper position with respect to the ratchet wheel 22.

During mass balance adjustment, the rocker plate 30 pivots about an axis 33 that is perpendicular to the paper as viewed in FIG. 2 and defined by pivots 34 mounted on each side of the rocker plate 30, only one of which is shown in dotted lines in FIG. 2. The pivots 34 are mounted on an extension of the gyro housing 14 and cooperate with elongated slots 35, only one of which is shown in dotted lines, on opposite sides of the rocker plate 30. To permit rocking motion of the rocker plate 30 and to maintain the gyro instrument hermetically sealed while allowing the rocker plate 30 to be manipulated from the exterior of the housing 14, a cylindrical resilient bellows 36 has one end hermetically sealed to the rocker plate 30 and its other end hermetically sealed to the housing 14. The latter end of the bellows 36 defines an opening 37 through the housing 14. Thus, the inside of the gyro housing 14 and the gyro fluid 13 are sealed from the outside of the instrument 10. The portion of the rocker plate 30 disposed within the interior of the bellows 36 has a threaded connection 40 adapted to receive a handle 41 which is screwed into the connection 40 and projects beyond the exterior of the housing 14.

To adjust the mass balance of the float 12, the handle 41 is screwed into the threaded connection 40 of the rocker plate 30. Then depending upon the direction of rotation desired to be imparted to the ratchet wheel 22, for example, if it is desired to rotate the wheel 22 counterclockwise, the handle 41 is rotated from its center position to the left or counterclockwise as viewed in FIG. 2. This causes the rocker plate 30 to pivot about the axis 33 contracting the right portion of the bellows 36 and expanding the left portion thereby causing the pawl 27 to engage the ratchet wheel 22 and rotate it one notch. The ratchet wheel 22 may be rotated further by repeating the motion of the handle 41 as many times as desired. The mass balance adjustment is reversed by moving the handle 41 from the center to its right hand position, i.e., clockwise thus bringing the pawl 26 into engagement with the ratchet wheel 22. The ratchet wheel 22 is maintained within the operating range of the pawls 26 and 27 throughout all rotation of the float 12 about the axis 15 by means of a limit stop 42.

Referring now to FIG. 3, it will be seen that end jamming of the adjusting screw 20 is prevented by having the width of the pawls 26 and 27 equal to the desired travel of the adjustment screw 20. The pawls 26 and 27 are offset with respect to each other so that when one pawl, for example 27 as shown in FIG. 3 rotates the screw 20 to the limit of its travel in one direction, the ratchet wheel 22 is no longer in a position to be engaged by this pawl 27. However, the other pawl 26 is still in alignment with the ratchet wheel 22 and may be used to return the adjusting screw 20 to any desired position within the limits of its travel.

A suitable design has been found to be where the screw travel is limited to 10 revolutions with the ratchet wheel 22 having 30 teeth thereby providing 300 distinct mass balance position adjustments. The mass of the screw and ratchet wheel assembly may be designed to provide a change in the gyro precession rate of 30 degrees per hour. Thus, a mass balance adjustment of ±15 degrees per hour in 0.1 degree per hour increments would be available with this design.

Figure 4:
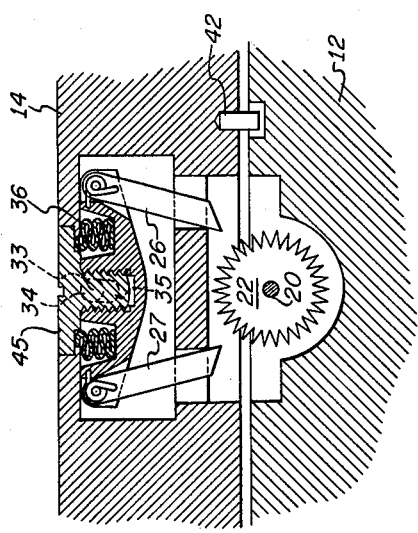
FIG. 4 is a sectional view similar to FIG. 2 but showing the invention in a disengaged position.

When a final mass balance adjustment is completed the handle 41 is removed and, as shown in FIG. 4, a flat head flush screw 45 is inserted in the threaded connection 40 which, when it is tightened, withdraws the rocker plate 30 until it is adjacent the interior of the housing 14 thereby contracting the bellows 36 and retracting the pawls 26 and 27 from engagement with the ratchet wheel 22 to prevent interference with the operation of the float 12. The flush screw 45 covers the opening 37 in the gyro housing 14 and provides a smooth exterior.

It will be appreciated that the present invention provides a final mass balance adjustment of the floated gyro float or sensitive element 12 with the gyro instrument 10 operating under normal conditions during a drift test run without disturbing the hermetic seal thereof. Further, the corrections are made in terms of actual test data, i.e., gyro drift rate. In addition, the adjustment of the mass balance may be made at any time without breaking the hermetic seal of the gyro instrument 10.

A simplified alternative embodiment of the present invention is shown in FIG. 5. In the alternative embodiment, the pawls 26 and 27 and the rocker plate 30 form a single element 50. The bellows 36 are connected to the element 50 and to the housing 14 in a manner similar to that described with respect to the embodiment of FIG. 2. As with the embodiment of FIG. 2, a handle 41 is adapted to be inserted in a threaded connection 40 for manipulating the element 50 and thereby rotating the ratchet wheel 22. The element 50 is pivoted by means of the bellows 36 and has sloping sides 51 and 52 respectively which cooperate with extensions of the interior of the housing 14. The sides 51 and 52 guide the downward movement of the element 50 in order that the pawls 26 and 27 may properly engage the ratchet wheel 22. To cause arcuate movement of the element 50 as it slides downward at the time of engagement in order to avoid excessive force being applied to the ratchet wheel 22, pins 53 and 54 are mounted on the extensions of the housing 14 to engage the sliding surfaces 51 and 52. As shown in dotted lines, the pins 53 and 54 causes the element 50 to travel in an arcuate path while rotating the ratchet wheel 22 rather than in a straight downward path.

Rotation clockwise or counterclockwise of the ratchet wheel 22 is provided by manipulating the handle 41 in a downward direction as well as clockwise or counterclockwise, the latter being similar to that described with respect to FIG. 2. The pawls 26 and 27 are offset and of a width as described with respect to FIG. 3 to prevent end-jamming. The handle 41 is removable after final adjustment and a flat head flush screw may be inserted to withdraw the pawls 26 and 27 and secure the element 50 to the housing 14.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A mass balance adjustment device for a gyroscopic instrument having a sensitive element hermetically sealed and positionably mounted within a housing comprising adjustable mass balance means mounted on said sensitive element, a rocking member pivotally mounted within said housing, cylindrical resilient means having one end hermetically sealed to said rocking member and the other end hermetically sealed to said housing, said end sealed to said housing defining an opening through said housing, first and second arms mounted on said rocking member and cooperative with said mass balance means for adjusting said mass balance means in accordance with the pivotal movement of said rocking member, and means coupled to said rocking member and extending exteriorally of said housing for pivoting said rocking member thereby adjusting said mass balance means while maintaining said instrument hermetically sealed.

2. A mass balance adjustment device for a gyroscopic instrument having a sensitive element hermetically sealed and positionably mounted within a housing comprising an adjustable ratchet wheel and screw mass balance assembly mounted on said sensitive element, a rocker plate pivotally mounted within said housing, resilient cylindrical bellows having one end hermetically sealed to said rocker plate and the other end hermetically sealed to said housing, said end sealed to said housing defining an opening through said housing, first and second pawls mounted on said rocker plate and cooperative with said ratchet wheel for adjusting said mass balance assembly in accordance with the pivotal movement of said rocker plate, and means coupled to said rocker plate and extending exteriorally of said housing for pivoting said rocker plate to thereby adjust said ratchet wheel and screw mass balance assembly while maintaining said instrument hermetically sealed.

3. A device as described in claim 2 in which said pawls have a width equal to that of the desired travel of said ratchet wheel and screw mass balance assembly, said pawls being offset for limiting the travel of said assembly while permitting said assembly to be returned to a desired position.

4. A device as described in claim 2 wherein said rocker plate and said first and second pawls are a single element.

5. A device as described in claim 2 further including limit means for maintaining said sensitive element within predetermined limits with respect to said housing.

6. A device as described in claim 2 further including means for resiliently urging said first and second pawls against opposite sides respectively of said ratchet wheel assembly.

7. A device as described in claim 2 further including means for securing said rocker plate to said housing and simultaneously rendering said pawls uncooperative with said ratchet wheel assembly.

References Cited in the file of this patent

UNITED STATES PATENTS

| | | |
|---|---|---|
| 3,010,326 | Koning | Nov. 28, 1961 |
| 3,046,797 | Swainson et al. | July 31, 1962 |